United States Patent Office 2,990,407
Patented June 27, 1961

2,990,407
17-DESMETHOXY-17-α-(N-ACETYL-N-METHYL-AMINO)-RESERPINE

Leon Velluz, Paris, and Georges Muller, Nogent sur Marne, France, assignors to Les Laboratoires Francais de Chimiotherapie, Paris, France, a corporation of France
No Drawing. Filed Dec. 19, 1958, Ser. No. 781,487
Claims priority, application France Dec. 20, 1957
3 Claims. (Cl. 260—287)

The present invention relates to analogues of reserpine, and more particularly to 11-methoxy-16β-methoxy carbonyl-17α-(acetyl methylamino)-18β-(3',4',5'-trimethoxy benzoyloxy)-3β,20α-yohimbane, and to a process of producing same, as well as to intermediates obtained thereby.

It is one object of the present invention to provide 11-methoxy-16β-methoxy carbonyl - 17α - (N-acetyl-N-methylamino) - 18β - (3',4',5-trimethoxy benzoyloxy)-3β, 20α-yohimbane.

Another object of the present invention is to provide an advantageous process of producing said yohimbane compound and its intermediates.

Other objects of the present invention and advantageous features thereof will become apparent as the description proceeds.

In principle, the present invention is concerned with the preparation of the levorotatory form (in chloroform) of said 11-methoxy-16β-methoxy carbonyl-17α-(N-acetyl-N-methylamino)-18β-(3',4',5,trimethoxy benzoyloxy)-3β, 20α-yohimbane of the following Formula XV

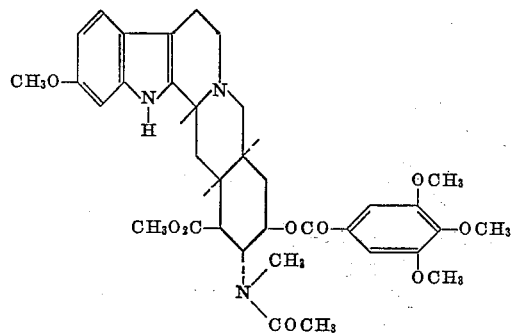

The present invention is equally concerned with the new intermediates obtained in the course of its preparation as well as with their use, especially in the synthesis of analogues of reserpine.

The 11-methoxy-16β-methoxy carbonyl-17α-(N-acetyl-N-methylamino)-18β-(3',4',5-trimethoxy benzoyloxy)-3β, 20α-yohimbane (levorotatory in chloroform) has a physiological activity similar to that of reserpine. It is, furthermore, a suitable intermediate in the preparation of other reserpine derivatives having interesting pharmacodynamic properties.

The starting material used according to the present invention is the lactone of 8β-hydroxy-2α-bromo-3β,5β-epoxy - 1,2,3,4,4aα,5,8,8aα - octahydronaphthalene-1β-carboxylic acid (dextrorotatory in ethanol), which is obtained, for instance, according to co-pending patent application Serial No. 693,028 of Georges Muller, Gerard Nomine, and Julien Warnant, filed October 29, 1957, and entitled "Polycyclic Compounds and Process of Preparing Same," now U.S. Patent No. 2,952,682, and corresponds to Formula I given hereinafter.

The following new intermediates are obtained in the course of the reaction according to the present invention:

The lactone of 8β-hydroxy-2α-methylamino-3β,5β-epoxy - 1,2,3,4,4aα,5,8,8aα - octahydronaphthalene-1β-carboxylic acid of Formula II given hereinafter.

The lactone of 8β-hydroxy-2α-(N-acetyl-N-methylamino) - 3β,5β - epoxy - 1,2,3,4,4aα,5,8,8aα - octahydronaphthalene-1β-carboxylic acid (dextrorotatory in ethanol) of Formula III given hereinafter.

The 1,8-lactone of 6α-bromo-7β,8β-dihydroxy-2α-(N-acetyl-N-methylamino)-3β,5β-epoxy - 4aα,8aα - dicahydronaphthalene-1β-carboxylic acid (levorotatory in dimethyl formamide) of Formula IV given hereinafter.

The lactone of 6α-bromo-7-oxo-8β-hydroxy-2α-(N-acetyl-N-methylamino)-3β,5β-epoxy - 4aα,8aα - decahydronaphthalene-1β-carboxylic acid (levorotatory in acetone) of Formula V given hereinafter.

3β-hydroxy-7-oxo-2α-(N-acetyl - N - methylamino)-1, 2,3,4,4aα,7,8,8aα-octahydronaphthalene - 1β - carboxylic acid (levorotatory in ethanol) of Formula VI given hereinafter.

3β-acetoxy-7-oxo-2α-(N-acetyl - N - methylamino)-1, 2,3,4,4aα,7,8,8aα-octahydronaphthalene - 1β - carboxylic acid (levorotatory in dimethyl formamide) of Formula VII given hereinafter.

The methyl ester of 3β-acetoxy-7-oxo-2α-(N-acetyl-N-methylamino) - 1,2,3,4,4aα,7,8,8aα - octahydronaphthalene-1β-carboxylic acid (levorotatory in ethanol) of Formula VIII given hereinafter.

1β-carboxy methyl -2β-methoxy carbonyl-3α-(N-acetyl-N-methylamino)-4β-acetoxy-6β-formyl cyclohexane of Formula IX given hereinafter.

The methyl ester of 1β-carboxy methyl-2β-methoxy carbonyl-3α-(N-acetyl-N-methylamino) - 4β - acetoxy-6β-formyl cyclohexane of Formula X given hereinafter.

The methyl ester of 18β-acetoxy-11-methoxy-16β-methoxy carbonyl-17α-(N-acetyl-N-methylamino)-2,3,3,4-diseco-20α,Δ⁴,²¹-yohimbene-3-carboxylic acid of Formula XI given hereinafter.

18β-hydroxy-11-methoxy-3-oxo-16β-methoxy carbonyl-17α - (N-acetyl-N-methylamino)-2,3-seco-20α-yohimbane (dextrorotatory in ethanol) of Formula XII given hereinafter.

11-methoxy-16β-methoxy carbonyl - 17α - (N-acetyl-N-methylamino)-18β-(3',4',5'-trimethoxy benzoyloxy)-3-oxo-2,3-seco-20α-yohimbane of Formula XIII given hereinafter.

11-methoxy - 16β - methoxy carbonyl-17α-(N-acetyl-N-methylamino)-18β-(3',4',5'-trimethoxy benzoyloxy)-3,4-dehydro-20α-yohimbane and its salts of Formula XIV given hereinafter.

The following flowsheet illustrates the procedure to be followed in the preparation of 11-methoxy-16β-methoxy carbonyl-17α-(N-acetyl - N - methylamino)-18β-(3',4',5'-trimethoxy benzoyloxy)-3β,20α-yohimbane of Formula XV.

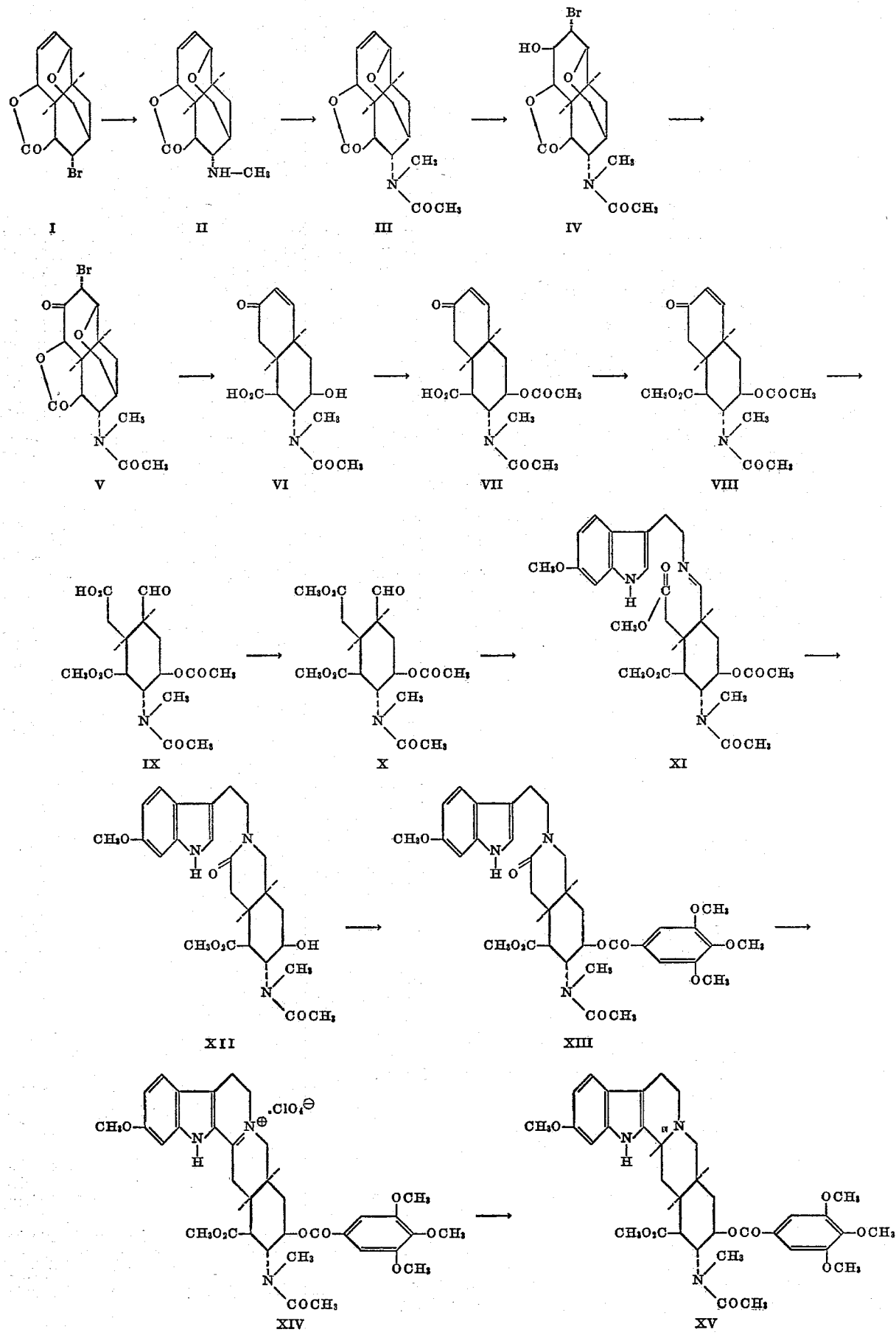

In principle, the process of the present invention consists in treating the lactone of 8β-hydroxy-2α-bromo-3β,5β - epoxy - 1,2,3,4,4aα,5,8,8aα-octahydronaphthalene-1β-carboxylic acid (dextrorotatory in ethanol), of Formula I with methylamine in a suitable solvent such as benzene or the like aromatic hydrocarbons. The resulting lactone of 8β-hydroxy-2α-methylamino-3β,5β-epoxy-1,2,3,4,4aα,5,8,8aα-octahydronaphthalene-1β-carboxylic acid of Formula II is isolated and acetylated with acetic acid anhydride in the presence of pyridine according to known procedures. The lactone of 8β-hydroxy-2α-(N-acetyl-N-methylamino)-3β,5β-epoxy - 1,2,3,4,4aα,5,8,8aα - octahydronaphthalene-1β-carboxylic acid of Formula III is brominated by means of N-bromo-succinimide in aqueous sulfuric acid and the brominated reaction product of Formula IV is oxidized by means of chromic acid in the presence of acetic acid. The resulting lactone of 6α-bromo-7-oxo-8β-hydroxy - 2α - (N - acetyl-N-methylamino)-3β,5β-epoxy-4aα,8aα-decahydronaphthalene-1β-carboxylic acid (levorotatory in acetone) of Formula V is treated with zinc in acetic acid and yields 3β-hydroxy-7-oxo-2α-(N-acetyl-N-methylamino) - 1,2,3,4,4aα, 7,8,8aα - octahydronaphthalene-1β-carboxylic acid (levorotatory form) of Formula VI. Said carboxylic acid is then acetylated with acetic acid anhydride in the presence of pyridine to yield the acetate of Formula VII, which is methylated by means of diazomethane in methylene chloride to produce the corresponding methyl ester of Formula VIII. Said ester is treated at a low temperature with ozone in ethyl acetate to yield 1β-carboxy methyl-2β-methoxy carbonyl-3α-(N-acetyl-N-methylamino)-4β-acetoxy-6β-formyl cyclohexane of Formula IX. After reaction with diazomethane in methylene chloride, the methyl ester of 1β-carboxy methyl-2β-methoxy carbonyl - 3α - (N - acetyl-N-methyl amino)-4β-acetoxy-6β-formyl cyclohexane of Formula X is obtained. Said compound is condensed with 6-methoxy tryptamine in methylene chloride to yield the methyl ester of 18β-acetoxy-11-methoxy-16β-methoxy carbonyl-17α-(N - acetyl - N - methylamino) - 2,3,3,4 - diseco-20α,$\Delta^{4,21}$-yohimbene-3-carboxylic acid of Formula XI. Said ester is reduced by the action of potassium boronhydride in methanol which reduction is accompanied by ring closure and selective saponification. The corresponding 2,3-seco-20α-yohimbane compound of Formula XII (dextrorotatory in ethanol) is isolated and is treated with trimethoxy benzoic acid anhydride in pyridine. The resulting trimethoxy benzoate of Formula XIII is cyclized by the action of phosphorus oxy-chloride in pyridine yielding the corresponding 3,4-dehydro-20α-yohimbane compound of Formula XIV which is isolated in the form of its perchlorate. Said compound is finally reduced by means of zinc and aqueous perchloric acid in tetrahydrofuran and acetone to 11-methoxy-16β-methoxy carbonyl-17α-(N-acetyl-N-methylamino) - 18β - (3',4',5' - trimethoxy benzoyloxy)-3β,20α-yohimbane of Formula XV.

It is also possible to isolate the 11-methoxy-16β-methoxy carbonyl - 17α - (N - acetyl - N - methylamino) - 18β-(3',4',5' - trimethoxy benzoyloxy) - 3,4 - dehydro - 20α-yohimbane in the form of other salts than its perchlorate, for instance, in the form of the nitrate, hydrochloride, phosphate, sulfate, and the like.

The following examples serve to illustrate the present invention without, however, limiting the same thereto. In particular, the reaction temperatures may be varied, other solvents and reagents may be used and the order of introducing the solvents and reactants may be varied in accordance with the principles set forth herein and in the claims annexed thereto.

The melting points are points of instantaneous melting. They are determined on the Maquenne block.

EXAMPLE 1

*Preparation of the lactone of 8β-hydroxy-2α-methylamino-3β,5β - epoxy - 1,2,3,4,4aα,5,8,8aα - octahydronaphthalene-1β-carboxylic acid of Formula II*

10 g. of the dextrorotatory lactone of 8β-hydroxy-2α-bromo - 3β,5β - epoxy - 1,2,3,4,4aα,5,8,8aα - octahydronaphthalene-1β-carboxylic acid, obtained according to the above mentioned copending patent application Serial No. 693,028, are introduced into 100 cc. of anhydrous benzene. 50 cc. of a 12% solution of methylamine in benzene are added at a temperature of 10° C. After standing for one hour at 10° C., the solution is concentrated by distillation in a vacuum to a volume of 50 cc. It is then filtered and the filtrate is evaporated to dryness in a vacuum to yield the lactone of 8β-hydroxy-2α-methylamino-3β,5β-epoxy-1,2,3,4,4aα,5,8,8aα - octahydronaphthalene - 1β - carboxylic acid of Formula II. Said lactone is obtained in the form of a pale yellow resin which is used directly in the following reaction step. This compound has not been described previously.

EXAMPLE 2

*Preparation of the lactone of 8β-hydroxy-2α-(N-acetyl-N-methylamino) - 3β,5β - epoxy - 1,2,3,4,4aα,5,8,8aα - octahydronaphthalene-1β-carboxylic acid (dextrorotary in ethanol) of Formula III*

The lactone of 8β - hydroxy - 2α - methylamino - 3β,5β-epoxy - 1,2,3,4,4aα,5,8,8aα - octahydronaphthalene - 1β-carboxylic acid of Formula II, obtained according to the preceding example is placed in solution in a mixture of 20 cc. of pyridine and 15 cc. of acetic acid anhydride. After standing at room temperature for one hour, the mixture is evaporated to dryness in a vacuum. 100 cc. of water are added to the residue, and enough methylene chloride to dissolve it. The water phase is then saturated with sodium chloride, decanted, and the organic phase washed with hydrochloric acid to a pH of 1.0 and then with sodium chloride-saturated water, dried over magnesium sulfate, and evaporated to dryness in a vacuum. The remaining residue is dissolved in a mixture of 4 parts of ethyl acetate and 6 parts of ether and is filtered to yield 7.78 g. of the dextrorotatory lactone of 8β-hydroxy-2α - (N-acetyl - N - methylamino) - 3β,5β - epoxy - 1,2,3,-4,4aα,5,8,8aα-octahydronaphthalene-1β-carboxylic acid of Formula III (corresponding to a yield of 80% calculated for the bromo lactone of Formula I). This compound which is new has a melting point of 184° C. Optical rotation: $[\alpha]_D^{20} = +53° \pm 2°$ (concentration=0.5% in ethanol). It is obtained in the form of small colorless crystals which are soluble in water, chloroform, and ethyl acetate and only slightly soluble in ether.

*Analysis.*—$C_{14}H_{17}O_4N$; molecular weight: 263.28. Calculated: 63.86% C; 6.51% H; 24.31% O; 5.32% N. Found: 63.8% C; 6.5% H; 24.0% O; 5.4% N.

EXAMPLE 3

*Preparation of the 1,8-lactone of the 6α-bromo-7β,8β-dihydroxy - 2α - (N - acetyl - N - methylamino) - 3β,5β-epoxy - 4aα,8aα - decahydronaphthalene - 1β - carboxylic acid (levorotatory in dimethyl formamide) of Formula IV*

23 g. of the lactone of 8β-hydroxy-2α-(N-acetyl-N-methylamino) - 3β,5β - epoxy - 1,2,3,4,4aα,5,8,8aα - octahydro naphthalene-1β-carboxylic acid (dextrorotatory in ethanol) of Formula III, obtained according to the preceding example, are dissolved in 80 cc. of water. 17.25 g. of N-bromo-succinimide and, thereafter, 34 cc. of N sulfuric acid are added to said solution. The temperature of the mixture is maintained at 60° C. for 30 minutes, whereafter the solution is cooled in an ice bath for four and one-half hours. The precipitate is filtered and washed with ice water until a pH of 7.0 is attained. After drying, 24.24 g. (78%) of the 1,8-lactone of 6α-bromo-7β,8β-dihydroxy - 2α - (N - acetyl - N - methylamino) - 3β,5β-epoxy-4aα,8aα-decahydronaphthalene-1β-carboxylic acid (levoratatory in dimethylformamide) of Formula IV are obtained. This product melts at about 260° C. (with decomposition). Optical rotation: $[\alpha]_D^{20} = -112° \pm 3°$ (concentration=0.5% in dimethyl formamide).

This compound has not been previously described.

*Analysis.*—$C_{14}H_{18}O_5NBr$; molecular weight: 360.21. Calculated: 46.68% C; 5.03% H; 22.21% O; 3.89% N; 22.19% Br. Found: 46.8% C; 5.1% H; 22.0% O; 3.8% N; 21.6% Br.

EXAMPLE 4

*Preparation of the lactone of 6α-bromo-7-oxo-8β-hydroxy-2α - (N - acetyl-N-methylamino)-3β,5β-epoxy-4aα,8aα-decahydronaphthalene-1β-carboxylic acid (levorotatory in acetone) of Formula V*

24 g. of the 1,8-lactone of 6α-bromo-7β,8β-dihydroxy-2α - (N - acetyl - N - methylamino) - 3β,5β - epoxy-4aα,8aα-decahydronaphthalene-1β-carboxylic acid (levorotatory in dimethyl formamide) of Formula IV obtained according to the preceding example, are introduced into 120 cc. of 50% acetic acid. While maintaining the temperature below 15° C., 120 cc. of a solution of 11.4% chromic acid in 90% acetic acid are added thereto. The solution is allowed to stand for four hours at room temperature. 480 cc. of a sodium chloride solution are added; the solution is extracted with methylene chloride; the extract is washed with a sodium chloride solution and then with a solution of sodium bicarbonate and is evaporated to dryness in a vacuum. The residue is dissolved in acetone and the solution is cooled in an ice bath. The precipitate is filtered, washed with ice-cold acetone, and dried to yield 17.31 g. of the lactone of 6α-bromo-7-oxo-8β - hydroxy - 2α - (N - acetyl - N - methylamino)-3β,5β-epoxy-4aα,8aα-decahydronaphthalene-1β-carboxylic acid (levorotatory in acetone) of Formula V. The yield is 72% of the theoretical yield. The melting point of the compound is about 265° C. (with decomposition). Optical rotation: $[\alpha]_D^{20} = -256° \pm 3°$ (concentration=0.5% in acetone).

*Analysis.*—$C_{14}H_{16}O_5NBr$; molecular weight: 358.20. Calculated: 46.94% C; 4.52% H; 22.32% O; 3.91% N. Found: 47.2% C; 4.5% H; 22.2% O; 3.8% N.

The new compound is obtained in the form of small, colorless crystals which are slightly soluble in water and soluble in acetone and chloroform.

EXAMPLE 5

*Preparation of 3β-hydroxy-7-oxo-2α-(N-acetyl-N-methylamino) - 1,2,3,4,4aα,7,8,8aα - octahydronaphthalene - 1β-carboxylic acid (levorotatory in ethanol) of Formula VI*

5 g. of the lactone of 6α-bromo-7-oxo-8β-hydroxy-2α - (N - acetyl - N - methylamino) - 3β,5β - epoxy - 4aα,8aα-decahydronaphthalene-1β-carboxylic acid (levorotatory in acetone) of Formula V, obtained according to the preceding example, are introduced into 100 cc. of acetone containing 10% of acetic acid. 10 g. of zinc powder are added and the mixture is refluxed for 30 minutes. It is then filtered and the filtrate is evaporated to dryness in a vacuum. The crude residue is used, without further purification, in the following reaction step.

For analytical purposes the compound is purified by dissolving the crude residue in 10 cc. of water and adding 12 cc. of ammonia and then 25 cc. of 0.2 N sulfuric acid thereto. Thereafter, the mixture is filtered and the aqueous phase is extracted with a mixture consisting of 7 parts to chloroform and 3 parts of ethanol. The extract is evaporated to dryness in a vacuum and the residue is dissolved in acetone to yield, after cooling, filtering and drying, 2 g. of 3β-hydroxy-7-oxo-2α-(N-acetyl-N - methylamino) - 1,2,3,4,4aα,7,8,8aα - octahydronaphthalene-1β-carboxylic acid (levorotatory in ethanol), of Formula VI, corresponding to a yield of 52% of the theoretical amount. Its melting point is 300° C.; optical rotation: $[\alpha]_D^{20} = -187° \pm 2°$ (concentration=0.5% in ethanol).

The compound is obtained in the form of small, colorless needles which are soluble in alcohol, slightly soluble in water, acetone, and chloroform, and insoluble in ether.

The compound has not been previously described.

*Analysis.*—$C_{14}H_{19}O_5N$; molecular weight: 281.30. Calculated: 59.77% C; 6.81% H; 28.44% O; 4.98% N. Found: 59.8% C; 6.7% H; 28.4% O; 4.9% N.

EXAMPLE 6

*Preparation of 3β-acetoxy-7-oxo-2α-(N-acetyl-N-methylamino) - 1,2,3,4,4aα,7,8,8aα - octahydronaphthalene - 1β-carboxylic acid (levorotatory in dimethyl formamide) of Formula VII*

The crude resin obtained according to the preceding example by the reduction of 5 g. of the lactone of 6α-bromo - 7 - oxo - 8β - hydroxy - 2α - (N - acetyl - N - methylamino) - 3β,5β - epoxy - 4aα,8aα - decahydronaphthalene - 1β - carboxylic acid (levorotatory in acetone) of Formula V, is dissolved in 25 cc. of pyridine and 20 cc. of acetic acid anhydride. It is heated to 60° C. for 30 minutes. The reaction mixture is evaporated to dryness in a vacuum. 25 cc. of water and 25 cc. of 0.2 N sulfuric acid are added to the residue. The mixture is filtered and yields 3.68 g. of 3β-acetoxy-7-oxo - 2α - (N - acetyl - N - methylamino) - 1,2,3,4,4aα, 7,8,8aα-octahydronaphthalene-1β-carboxylic acid (levorotatory) of Formula VII. The yield is 80% of the theoretical yield. The melting point is above 330° C. at which temperature decomposition takes place. Optical rotation: $[\alpha]_D^{20} = -165° \pm 2°$ (concentration=0.5% in dimethyl formamide). The new compound is obtained in the form of small, colorless crystals which are insoluble in water and soluble in ethanol and in methanol.

*Analysis.*—$C_{16}H_{21}O_6N$; molecular weight: 323.34. Calculated: 59.43% C; 6.54% H; 29.70% O; 4.33% N. Found: 59.6% C; 6.6% H; 29.7% O; 4.3% N.

EXAMPLE 7

*Preparation of the methyl ester of 3β-acetoxy-7-oxo-2α-(N - acetyl - N - methylamino) - 1,2,3,4,4aα,7,8,8aα - octahydronaphthalene-1β-carboxylic acid of Formula VIII (levorotatory in ethanol)*

The 3β - acetoxy-7-oxo-2α-(N-acetyl-N-methylamino)-1,2,3,4,4aα,7,8,8aα - octahydronaphthalene - 1β - carboxylic acid of Formula VII (levorotatory in dimethyl formamide), as it is obtained according to Example 6, is suspended in 50 cc. of methylene chloride. The resulting suspension is reacted at 2° C. with a solution of diazomethane in methylene chloride. The reaction mixture is filtered through 25 g. of neutral aluminum oxide. The filtrate is evaporated to dryness in a vacuum and the residue is recrystallized from a mixture of acetone and ether (1:1). 2.830 g. of the methyl ester of Formula VIII are obtained. The yield is 77% of the theoretical amount. Its melting point is 175° C.; its optical rotation $[\alpha]_D^{20} = -168° \pm 2°$ (concentration=0.5% in ethanol). The compound which has not been described previously is obtained in the form of colorless small prisms which are soluble in acetone and chloroform and very little soluble in ether.

*Analysis.*—$C_{17}H_{23}O_6N$; molecular weight: 337.36. Calculated: 60.52% C; 6.87% H; 28.46% O; 4.15% N. Found: 60.4% C; 6.8% H; 28.8% O; 4.0% N.

EXAMPLE 8

*Preparation of the methyl ester of 1β-carboxy methyl-2β - methoxy carbonyl-3α-(N-acetyl-N-methylamino)-4β-acetoxy-6β-formyl cyclohexane of Formula X*

5 g. of the methyl ester of the 3β-acetoxy-7-oxo-2α-(N -acetyl - N - methylamino) - 1,2,3,4,4aα,7,8,8aα - octahydronaphthalene - 1β-carboxylic acid of Formula VIII(levorotatory in ethanol) as obtained according to the preceding example, are dissolved in 120 cc. ethyl acetate. 20 cc. of the resulting solution is distilled off at atmospheric pressure. The resulting concentrated solution is cooled to −35° C. A stream of oxygen containing 1% of ozone is passed through the solution in an amount of 0.81 l. per minute for 50 minutes. Thereafter, nitrogen is passed through the solution for 10 minutes.

5 cc. of ice water are then added to the reaction mixture which is heated under reflux for 45 minutes. The resulting mixture is cooled in an ice bath, the ethyl acetate solution is removed by decanting, dried over magnesium sulfate, and evaporated to dryness in a vacuum. The residue represents the 1β-carboxy methyl-2β-methoxy carbonyl-3α-(N-acetyl-N-methylamino)-4β-acetoxyformyl cyclohexane of Formula IX, which is taken up with 50 cc. of a solution of diazomethane in methylene chloride. The reaction mixture is allowed to stand at 5° C. for 30 minutes and is then concentrated by evaporation in a vacuum to a volume of 25 cc. The resulting solution which contains the methyl ester of 1β-carboxy-methyl-2β-methoxy carbonyl-3α-(N-acetyl-N-methylamino)-4β-acetoxy-6β-formyl cyclohexane of Formula X is used without further purification in the next reaction step.

EXAMPLE 9

*Preparation of the methyl ester of the 18β-acetoxy-11-methoxy-16β-methoxy carbonyl-17α-(N-acetyl-N-methylamino) 2,3,3,4 - diseco - 20α,Δ$^{4,21}$ - yohimbene - 3-carboxylic acid of Formula XI*

The solution of the crude methyl ester of 1β-carboxy methyl-2β-methoxy carbonyl-3α-(N-acetyl-N-methylamino)-4β-acetoxy-6β-formyl cyclohexane of Formula X obtained according to the preceding example is mixed with 3.7 g. of 6-methoxy tryptamine. The mixture is allowed to stand at 25° C. for 10 minutes and thereafter at 5° C. for one hour. The methyl ester of the 18β-acetoxy-11-methoxy-16β-methoxy carbonyl-17α-(N-acetyl-N-methylamino)-2,3,3,4-diseco-20α,Δ$^{4,21}$-yohimbene - 3 - carboxylic acid of Formula XI is obtained thereby in an almost quantitative yield. The compound is new. It is quite unstable and, therefore, cannot be isolated in solid form. Its solution serves as starting material for the following example.

EXAMPLE 10

*Preparation of 18β-hydroxy-11-methoxy-3-oxo-16β-methoxy carbonyl-17α-(N-acetyl-N-methylamino)-2,3-seco-21α-yohimbane (dextrorotatory in ethanol) of Formula XII*

50 cc. of methanol are added to the solution of the methyl ester of 18β-acetoxy-11-methoxy-16β-methoxy carbonyl - 17α - (N - acetyl - N - methylamino) - 2,3,3,4-diseco-20α,Δ$^{4,21}$-yohimbene-3-carboxylic acid of Formula XI as obtained according to the preceding example. While maintaining the temperature of the resulting solution at 5° C., 2.6 g. of potassium boronhydride are added thereto. The mixture is stirred for 15 minutes. Methylene chloride is distilled off and the methanol solution is heated under reflux for one and a half hours. The reaction mixture is cooled by the addition of ice, acidified by the addition of 2 N hydrochloric acid to a pH of 1.0, and extracted with methylene chloride. The extract is washed with water, sodium bicarbonate solution, and again with water, dried over magnesium sulfate, and evaporated to dryness in a vacuum. The residue is dissolved in acetone, cooled in an ice bath, and the precipitate is filtered. 5.63 g. of 18β-hydroxy-11-methoxy-3-oxo-16β-methoxy carbonyl-17α-(N-acetyl-N-methylamino)-2,3-seco-20α-yohimbane (dextrorotatory) of Formula XII are obtained. The yield is 77% calculated for the compound of Formula VIII. Its melting point is 225° C.; its optical rotation $[\alpha]_D^{20} = +3°$ (concentration: 0.5% in ethanol).

The compound is obtained in the form of small colorless crystals which are soluble in alcohol and chloroform, slightly soluble in acetone, and insoluble in ether. The compound has not been described previously.

*Analysis.*—$C_{25}H_{33}O_3N_3$; molecular weight: 471.54. Calculated: 63.67% C; 7.05% H; 20.36% O; 8.91% N. Found: 63.6% C; 7.0% H; 20.6% O; 8.9% N.

EXAMPLE 11

*Preparation of 11-methoxy-16β-methoxy carbonyl-17α-(N-acetyl - N - methylamino)-18β-(3',4',5'-trimethoxy benzoyloxy)-3-oxo-2,3-seco-20α-yohimbane of Formula XIII*

1.5 g. of 18β-hydroxy-11-methoxy-3-oxo-16β-methoxy carbonyl-17α-(N-acetyl - N - methylamino)-2,3-seco-20α-yohimbane (dextrorotatory in ethanol) of the Formula XII, as obtained according to the preceding example, are dissolved in 3 cc. of triethylamine and 9 cc. of pyridine. 2.25 g. of the anhydride of trimethoxy benzoic acid are added thereto. The mixture is heated to 90° C. and kept at said temperature for 24 hours. The reaction mixture is cooled, 5 cc. of water are added, and the mixture is allowed to stand at 45° C. for 30 minutes. Methylene chloride is added thereto. The mixture is acidified by the addition of hydrochloric acid to a pH of 1.0, extracted with water, with sodium bicarbonate solution, and again with water, dried over magnesium sulfate, and evaporated to dryness in a vacuum. The residue is triturated with a mixture of ethyl acetate and ether (4:6) and is filtered. 1.9 g. of 11-methoxy-16β-methoxy carbonyl-17α-(N-acetyl - N - methylamino) - 18β-(3',4',5'-trimethoxy benzoyloxy)-3-oxo-2,3-seco-20α-yohimbane of Formula XIII are obtained in the form of an amorphous powder. The yield is 90% of the theoretical amount. The new compound can be purified with difficulty only and, therefore, is used as such in the following reaction step.

EXAMPLE 12

*Preparation of 11-methoxy-16β-methoxy carbonyl-17α-(N-acetyl - N - methylamino)-18β-(3',4',5'-trimethoxy benzoyloxy)3β,20α-yohimbane of Formula XV (levorotatory in chloroform)*

9.5 cc. of pyridine and 3.8 cc. of phosphorus oxychloride are mixed in the cold. The mixture is cooled to −10° C. 1.9 g. of 11-methoxy-16β-methoxy carbonyl-17α-(N - acetyl - N - methylamino)-18β-(3',4',5'-trimethoxy benzoyloxy)-3-oxo-2,3-seco-20α-yohimbane of Formula XIII obtained according to the preceding example are added thereto while stirring and keeping the temperature between −5° C. and 0° C. The reaction mixture is allowed to stand at 0° C. for half an hour and thereafter at room temperature for 16 hours. It is poured on crushed ice, the aqueous solution is decanted, 3 cc. of a 65% aqueous solution of perchloric acid are added, the precipitate is filtered, and washed with water. The resulting moist paste which represents the perchlorate of 11 - methoxy - 16β - methoxy carbonyl-17α-(N-acetyl-N-methylamino)-18β-(3',4',5'-trimethoxy benzoyloxy)-3,4-dehydro-20α-yohimbane of Formula XIV is filtered and dissolved in a mixture of 15 cc. of acetone, 15 cc. of tetrahydrofuran, and 15 cc. of 13% perchloric acid solution. 0.3 cc. of a solution of ferric chloride (45° Bé) and, subsequently, 1.5 g. of zinc powder are added and the mixture is heated under reflux for 30 minutes. After filtration, the reaction solution is concentrated by evaporation to half its volume and extracted with methylene chloride. The extract is washed with 10% ammonia solution and with water, is dried over magnesium sulfate, and evaporated to dryness in a vacuum. The residue is dissolved in methanol, cooled, and filtered. 470 mg. of 11 - methoxy - 16β - methoxy carbonyl-17α-(N-acetyl-N-methylamino)-18β-(3',4',5'-trimethoxy benzoyloxy)-3β,20α-yohimbane (levorotatory) of Formula XV are obtained. The yield is 24% of the theoretical amount. Its melting point is 250° C. and, after resolidification, 300° C.; optical rotation: $[\alpha]_D^{20} = −134° + 2°$ (concentration: 0.5% in chloroform).

Said compound is new. It is obtained in the form of small colorless crystals which are insoluble in water and ether, slightly soluble in alcohol, and soluble in chloroform.

*Analysis.*—$C_{35}H_{43}O_9N_3$; molecular weight: 649.71. Calculated: 64.70% C; 6.67% H; 6.47% N. Found: 64.9% C; 6.7% H; 6.5% N.

The infrared spectrum confirms the structure of the compound.

As stated hereinabove, the new compound represents a valuable pharmaceutical compound which can be used for its tranquilizing and blood pressure reducing effect in a similar manner as this is known for reserpine.

We claim:

1. A 1β-substituted-2β-methoxy carbonyl-3α-(N-acetyl-N-methylamino)-4β-acetoxy-6β-formyl cyclohexane compound of the formula

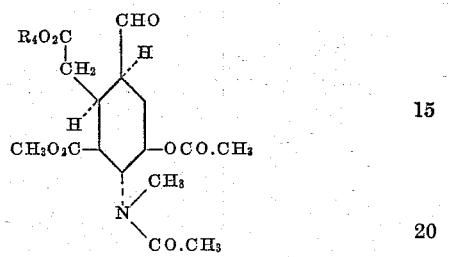

wherein $R_4$ is a member selected from the group consisting of hydrogen and the methyl radical.

2. The levorotatory (chloroform) isomer of 11-methoxy-16β-methoxy carbonyl-17α-(N-acetyl-N-methylamino)-18β-(3',4',5'-trimethoxy benzoyloxy)-3β,20α-yohimbane having the structural formula

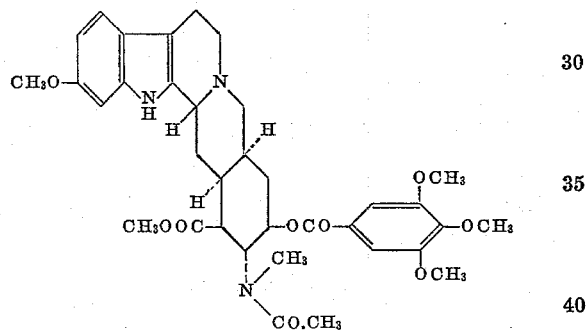

3. The levorotatory (ethanol) isomer of 3β-hydroxy-7-oxo - 2α - (N-acetyl-N-methylamino)-1,2,3,4,aα,7,8,8aα-octahydronaphthalene-1β-carboxylic acid having the structural formula

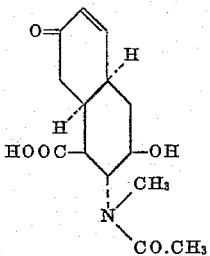

References Cited in the file of this patent

UNITED STATES PATENTS

| | | |
|---|---|---|
| 2,857,385 | Kuehne | Oct. 21, 1958 |
| 2,883,384 | Woodward | Apr. 21, 1959 |

OTHER REFERENCES

Wagner et al.: Synthetic Organic Chemistry, Wiley, N.Y. (1953), pages 567, 568 and 667.

Woodward et al.: J. Am. Chem. Soc., vol. 78, pp. 2021–5 (1956).

UNITED STATES PATENT OFFICE
CERTIFICATION OF CORRECTION

Patent No. 2,990,407                              June 27, 1961

Leon Velluz et al.

It is hereby certified that error appears in the above numbered patent requiring correction and that the said Letters Patent should read as corrected below.

In the heading to the printed specification, lines 2 and 3, title of invention, for "17-DESMETHOXY-17-α-(N-ACETYL-N-METHYLAMINO)-RESERPINE" read -- 17-DESMETHOXY-17α-(N-ACETYL-N-METHYLAMINO)-RESERPINE --; column 1, lines 29 and 50, for "-(3',4',5-", each occurrence, read -- -(3',4',5'- --; column 2, line 16, for "-dicahy-" read -- -decahy- --; line 42, for "-2,3,3,4-" read -- -2,3-3,4- --; column 5, line 34, for "-N-methyl" read -- -N-methyl- --; line 39, for "-2,3,3,4-" read -- -2,3-3,4- --; column 6, line 38, for "-1,2,3,-" read -- -1,2,3, --; column 7, line 34, for "22.32%" read -- 22.33% --; column 9, line 7, for "-4β-acetoxy-" read -- -4β-acetoxy-6β- --; lines 21, 31, and 44, for "2,3,3,4", each occurrence, read -- 2,3-3,4 --; same column 9, line 41, for "21α-" read -- 20α- --; column 10, line 32, for "benzoyloxy)3β,", in italics, read -- benzoyloxy)-3β, --, in italics; line 67, for "—134°+2°" read -- —134°±2° --; column 12, line 2, for "-1,2,3,4,aα," read -- -1,2,3,4,4aα, --.

Signed and sealed this 5th day of December 1961.

(SEAL)
Attest:

ERNEST W. SWIDER                              DAVID L. LADD
Attesting Officer                            Commissioner of Patents